S. Reynolds.
Making Hoes and Shovels.
Nº 1,142.
32,146.
Patented Apr. 23, 1861.
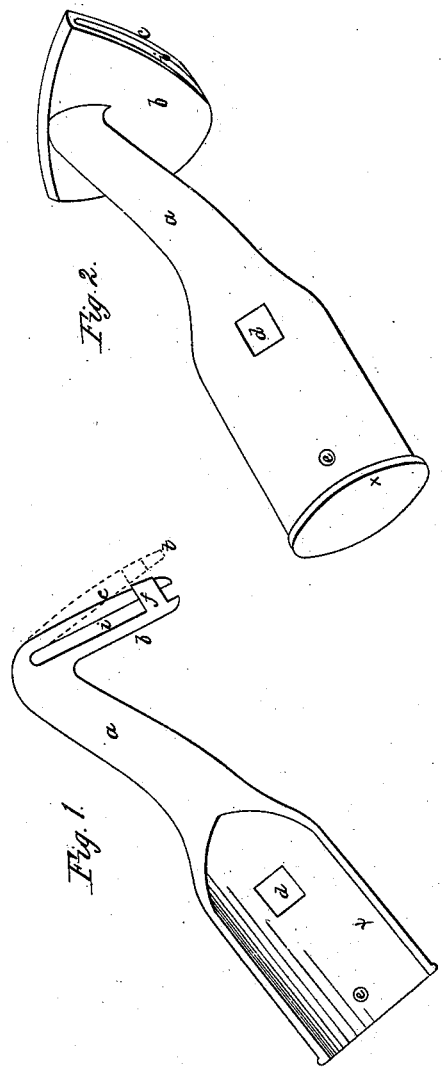
Witnesses:
G. P. Steck
N. C. Hayden
Inventor:
Samuel Reynolds

UNITED STATES PATENT OFFICE.

SAMUEL REYNOLDS, OF DUQUESNE BOROUGH, PENNSYLVANIA.

IMPROVED HANDLE FOR HOES.

Specification forming part of Letters Patent No. 32,146, dated April 23, 1861.

*To all whom it may concern:*

Be it known that I, SAMUEL REYNOLDS, of Duquesne Borough, in the county of Allegheny and State of Pennsylvania, have invented certain new and useful Improvements in Securing Hoes, Shovel-Blades, &c., to the Shank or Handle; and I do hereby declare that the following is a full and exact description thereof, reference being had to the accompanying drawings, and to the letters of reference marked thereon.

The nature of my invention consists in the use of a socket or ferrule, shank, bearing heads or straps, and rivet or rivets used for securing the blades of hoes, shovels, &c., to the shank or handle, the whole being made in one piece and of malleable iron, arranged, constructed, and operated in the manner hereinafter described.

To enable others skilled in the art to make and use my invention, I will proceed to describe its construction and operation.

In the accompanying drawings, Figure 1 is a cut or sectional view of the socket or ferrule, shank, bearing heads or straps, and the rivet. Fig. 2 is a perspective view of the socket or ferrule, shank, and bearing heads or straps.

$x$ is the socket or ferrule. $a$ is the shank. $b$ is the front bearing head or strap. $c$ is the back bearing head or strap. $f$ is the rivet, which is cast on the bearing-head $b$. The back bearing-head, $c$, is furnished with an opening opposite to the rivet $f$. $i$ is the space for the blade of the hoe or shovel, which must be furnished with an opening for the rivet $f$. The space $i$ must correspond in width to the thickness of the blade used. The space $i$ and rivet $f$ are made by a core in casting. The space $i$ should be spread out at the points of the bearing-heads, as indicated by the dotted lines $t$, sufficient to allow the blade to pass the point of the rivet $f$. $e$ is an opening in the socket or ferrule for a rivet or screw. $d$ is an opening at the lower end of the socket or ferrule, which is formed by the supports of the core, and may be used for securing the wooden handle in the socket. The shape of the socket or ferrule, shank, and bearing-heads may be varied in form and size to correspond to the form and size of the blade used.

The operation of securing the blade between the bearing-heads is as follows: The blade is placed in the recess or space $i$, with the rivet $f$ through the opening made in the blade. The bearing-head $c$ is then bent or forced down to the blade, the rivet $f$ passing through the bearing-head $c$. The rivet is then headed down, which will secure the blade firmly to its place between the two bearing-heads $b$ and $c$.

Having thus described the nature, construction, and operation of my improvement, what I claim as of my invention, and desire to secure by Letters Patent of the United States, is—

The use of the socket or ferrule, shank, bearing heads or straps, and rivet, when made in one piece, as herein described, and for the purpose set forth.

SAMUEL REYNOLDS.

Witnesses:
   G. P. STECK,
   H. C. HAYDEN,
   JAMES MILLER.